United States Patent
Varkey et al.

(10) Patent No.: US 8,607,868 B2
(45) Date of Patent: Dec. 17, 2013

(54) COMPOSITE MICRO-COIL FOR DOWNHOLE CHEMICAL DELIVERY

(75) Inventors: Joseph Varkey, Sugar Land, TX (US);
Zhanke Liu, Houston, TX (US);
Philippe Gambier, La Defense (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 304 days.

(21) Appl. No.: 12/856,776

(22) Filed: Aug. 16, 2010

(65) Prior Publication Data

US 2011/0042090 A1  Feb. 24, 2011

Related U.S. Application Data

(60) Provisional application No. 61/274,246, filed on Aug. 14, 2009.

(51) Int. Cl.
*E21B 43/22* (2006.01)
(52) U.S. Cl.
USPC ............... 166/305.1; 166/77.2; 166/242.2; 166/242.3; 138/143; 138/139
(58) Field of Classification Search
USPC ............ 166/305.1, 242.1, 242.2, 242.3, 77.2; 138/143, 139
See application file for complete search history.

(56) References Cited

U.S. PATENT DOCUMENTS

| | | | |
|---|---|---|---|
| 3,238,808 A * | 3/1966 | Barnard | 74/502.5 |
| 3,859,851 A | 1/1975 | Urbanosky | |
| 4,860,581 A | 8/1989 | Zimmerman et al. | |
| 4,994,671 A | 2/1991 | Safinya et al. | |
| 5,110,644 A * | 5/1992 | Sparks et al. | 428/36.3 |
| 5,266,800 A | 11/1993 | Mullins | |
| 5,921,285 A * | 7/1999 | Quigley et al. | 138/125 |
| 5,939,717 A | 8/1999 | Mullins | |
| 6,016,845 A * | 1/2000 | Quigley et al. | 138/125 |
| 6,065,540 A * | 5/2000 | Thomeer et al. | 166/297 |
| 6,296,066 B1 * | 10/2001 | Terry et al. | 175/92 |
| 6,863,137 B2 * | 3/2005 | Terry et al. | 175/92 |
| 6,959,762 B2 | 11/2005 | Sask | |
| 7,066,283 B2 | 6/2006 | Livingstone | |
| 7,419,937 B2 | 9/2008 | Rimmer et al. | |
| 8,069,900 B2 * | 12/2011 | Nobileau | 160/380 |
| 2003/0155156 A1 | 8/2003 | Livingstone | |

(Continued)

FOREIGN PATENT DOCUMENTS

| | | |
|---|---|---|
| WO | 9216696 A1 | 10/1992 |
| WO | 0165055 A1 | 9/2001 |
| WO | 0212674 A1 | 2/2002 |
| WO | 2007075855 A2 | 7/2007 |

OTHER PUBLICATIONS

Burgess et al., Formation Testing and Sampling Through Casing, pp. 47-57, Spring 2002.

*Primary Examiner* — Nicole Coy
(74) *Attorney, Agent, or Firm* — Michael Flynn; Timothy Curington; Robin Nava

(57) ABSTRACT

A technique utilizes micro-coil which is formed as a composite to enable use at substantial depths and/or with substantial flow rates. The micro-coil is formed as a tubing with a multi-layered tubing wall. The composite tubing wall provides substantial strength and longevity which allows deployment of the micro-coil in a much wider variety of well treatment applications, such as applications having substantial flow rates and/or applications at substantial well depths.

23 Claims, 3 Drawing Sheets

(56) References Cited

U.S. PATENT DOCUMENTS

| | | |
|---|---|---|
| 2004/0104052 A1 | 6/2004 | Livingstone |
| 2006/0169495 A1* | 8/2006 | Kolle .............................. 175/61 |
| 2007/0151735 A1 | 7/2007 | Ravensbergen et al. |
| 2007/0254814 A1 | 11/2007 | Kotlar |
| 2008/0264630 A1 | 10/2008 | Lavrut et al. |

* cited by examiner

COMPOSITE MICRO-COIL FOR DOWNHOLE CHEMICAL DELIVERY

CROSS-REFERENCE TO RELATED APPLICATION

The present document is based on and claims priority to U.S. Provisional Application Ser. No. 61/274,246, filed Aug. 14, 2009.

BACKGROUND

During and after many downhole wellbore operations, such as hydraulic fracturing, a controlled release of chemicals often is required. A variety of chemical treatments, e.g. acid etching, have been used to enhance hydrocarbon production in such wellbore operations. It has been a challenging job to deliver chemicals in real-time and in a controlled manner. A number of solutions have been proposed, such as the use of a fluid plug, a canister, and encapsulation. Additionally, the use of micro-coil chemical delivery has been attempted, but the turbulent flow can be problematic for the micro-coil tubing.

For example, when using micro-coil, one of the major technical challenges is coil survivability. During hydraulic fracturing operations, the micro-coil is subjected to significant fluid drag force due to the large annular flow rate between the micro-coil and the production tube or casing. This external drag force, combined with the weight of the micro-coil, can lead to premature failure/breakage of the micro-coil. This survivability issue severely limits the maximum flow rate that can be pumped during the fracturing job and also limits the maximum depth that can be reached for the chemical delivery.

Existing micro-coil chemical delivery systems have focused on isotropic metal tubes, such as stainless steel and Inconel tubes. This is a viable solution as long as the target flow rate and/or the treatment depth are relatively small. However, the micro-coil is not able to withstand large flow rates and/or placement at substantial well depths.

SUMMARY

In general, a system and method is described as enabling use of micro-coil at substantial depths and/or with substantial flow rates. A composite micro-coil is formed as a tubing with a multi-layered tubing wall. The composite tubing wall provides substantial strength and longevity which enables deployment of the micro-coil in a much wider variety of well treatment applications, such as applications having substantial flow rates and/or applications at substantial well depths.

BRIEF DESCRIPTION OF THE DRAWINGS

Certain embodiments will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The embodiments described herein generally relate to a system and method of using composite micro-coils to deliver chemicals downhole in a wellbore. The micro-coil may be employed for real-time chemical delivery, and the unique design substantially enhances survivability. During a variety of well treatment applications, such as hydraulic fracturing operations, the composite micro-coil is able to better withstand the significant fluid drag forces due to large annular flow rates between the micro-coil and the production tubing or casing. The improved strength of the composite micro-coil enables the micro-coil to withstand the external drag force in combination with the weight of the micro-coil to avoid premature failure/breakage of the micro-coil which tended to occur in conventional systems.

According to one embodiment, a production well stimulation application utilizes the composite micro-coil to provide real-time delivery of chemicals downhole for enhanced oil and/or gas production. In this particular example, the micro-coil is a multi-layer micro-coil incorporating a carbon-epoxy composite between metallic layers. However, other layers and materials may be employed, as discussed in greater detail below.

The multi-layer composite design withstands the higher flow rates and is able to reach deeper locations than conventional tubings, such as conventional metal tubes. By confining chemicals inside, the composite micro-coil solution also minimizes detrimental impacts on the production well, downhole tools, and the natural environment. Also, it allows controlled chemical release at the target depth without premature reaction or loss. The controlled parameters may include the mixing depth, mixing time, flow/mixing rate, and total chemical quantities.

Figure 1:
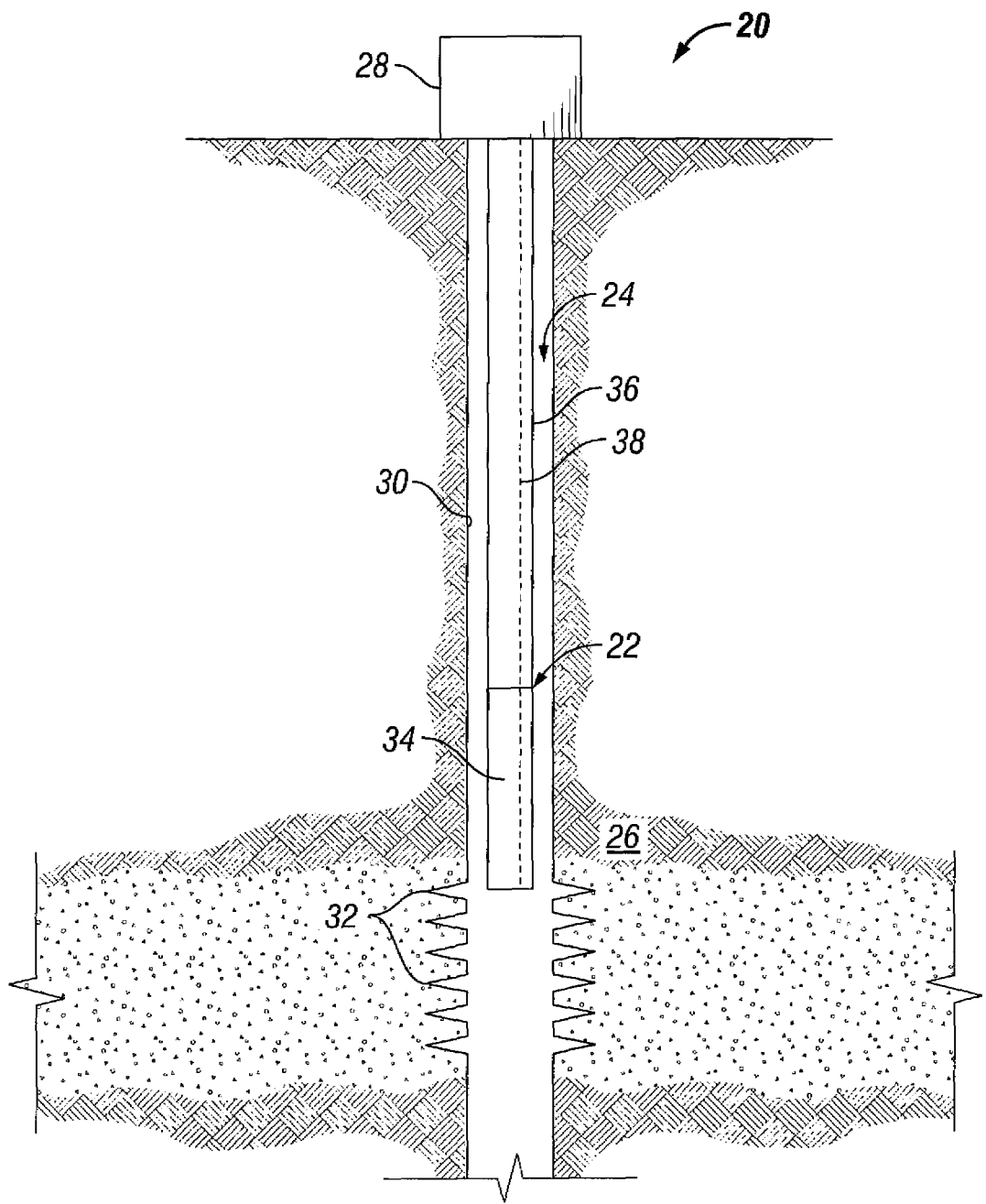
FIG. 1 is a schematic front elevation view of one embodiment of a well system having a micro-coil tubing deployed in a wellbore for a well treatment application.

Referring generally to FIG. 1, one embodiment of a well system 20 is illustrated as having a well treatment system 22 deployed in a wellbore 24. The wellbore 24 extends down from a surface location and into or through a subterranean formation 26 below surface equipment 28, such as a wellhead. By way of example, the wellbore 24 may be cased with a casing 30 having perforations 32 which allow injection of the treatment fluid into the surrounding subterranean formation 26.

The well treatment system 22 is illustrated schematically and may comprise a variety of configurations and components. By way of example, the well treatment system 22 comprises hydraulic fracturing equipment 34 deployed downhole into wellbore 24 by a suitable conveyance 36, e.g. production tubing or coiled tubing. The well system 20 also comprises at least one micro-coil 38 which is deployed down through the wellbore within, or along the exterior of, conveyance 36 and well treatment system 22. The micro-coil 38 is a composite micro-coil which may be formed in a tubular configuration having a multi-layered wall, as described in greater detail below. A variety of desired chemicals may be delivered downhole through an internal flow passage of the composite micro-coil 38 for delivery into the wellbore 24 and/or into the surrounding subterranean formation 26. In an application, the micro-coil is conveyed downhole into the wellbore 24, and a chemical treatment is delivered downhole through an interior flow passage of the micro-coil.

Figure 2:
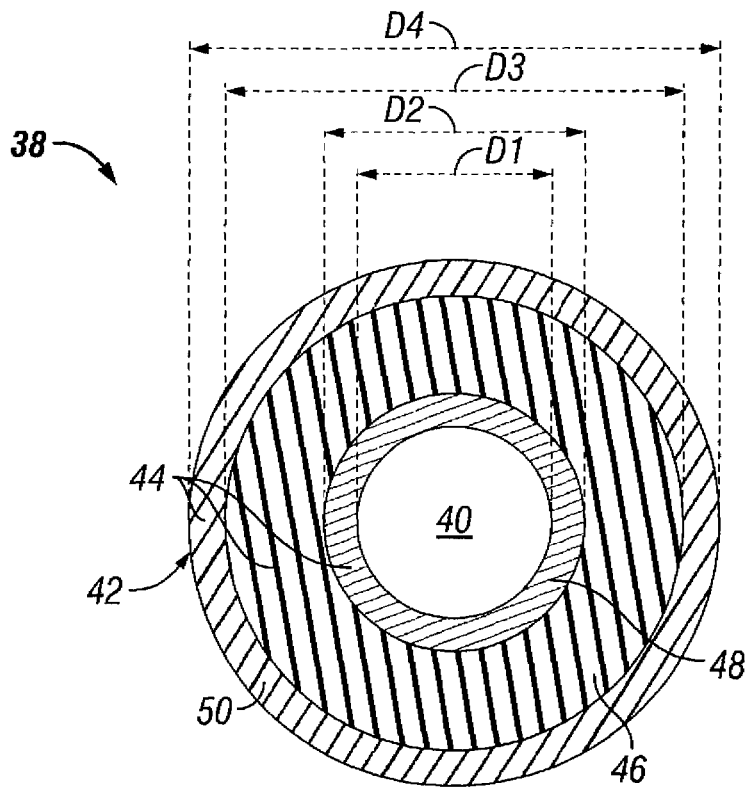
FIG. 2 is a cross-sectional view of one embodiment of a micro-coil.

Referring generally to FIG. 2, one embodiment of the composite micro-coil 38 is illustrated in cross-section. In this example, the composite micro-coil 38 is generally tubular having an internal flow passage 40 and a composite tubular wall 42 comprising a plurality of layers 44. By way of specific example, the composite tubular wall 42 may be in the form of a triple layer sandwich construction, in which a non-metallic middle layer 46, e.g. composite layer, is sandwiched between a metal internal layer 48 and a metal external layer 50.

The composite micro-coil 38 may be formed with a variety of geometries depending on the specific well treatment application for which it is designed. Examples of geometries are provided in the following Table 1 in conjunction with FIG. 2:

TABLE 1

|  | D1 (inch) | D2 (inch) | D3 (inch) | D4 (inch) | t1 (inch) | t2 (inch) | t3 (inch) | t (inch) |
|---|---|---|---|---|---|---|---|---|
| Composite design 1 | 0.120 | 0.170 | 0.220 | 0.250 | 0.015 | 0.025 | 0.025 | 0.065 |
| Composite design 2 | 0.152 | 0.172 | 0.230 | 0.250 | 0.010 | 0.029 | 0.010 | 0.049 |
| Composite design 3 | 0.120 | 0.140 | 0.230 | 0.250 | 0.010 | 0.045 | 0.010 | 0.065 |

In this example, the inside diameter of the composite micro-coil 38 (the diameter of internal flow passage 40) is D1 and the outside diameter of the composite micro-coil 38 is D4. In Table 1 above, t1 is the thickness of metal external layer 50 which is equal to (D4−D3)/2. The thickness of composite layer 46 is labeled t2 and is equal to (D3−D2)/2. The thickness of metal internal layer 48 is labeled t3 and is equal to (D2−D1)/2. An overall thickness of tubular wall 42 is labeled t which is equal to (D4−D1)/2.

Table 1 provides examples of the composite micro-coil 38 which have substantially greater strength and provide superior performance when compared to conventional designs. In this example, t1, t2, t3, and t, respectively, correspond to the thickness of the outside metal layer 50 (e.g. a layer of Inconel 825); the thickness of composite layer 46 (e.g. a layer of carbon-epoxy composite, 40% fiber volume); the thickness of inside metal layer 48 (e.g. a layer of stainless steel), and the total wall thickness. It should be noted with respect to Table 1, composite design 1 and composite design 3 have the same total wall thickness but different thickness distribution among the three layers 44 of materials.

Figure 3:
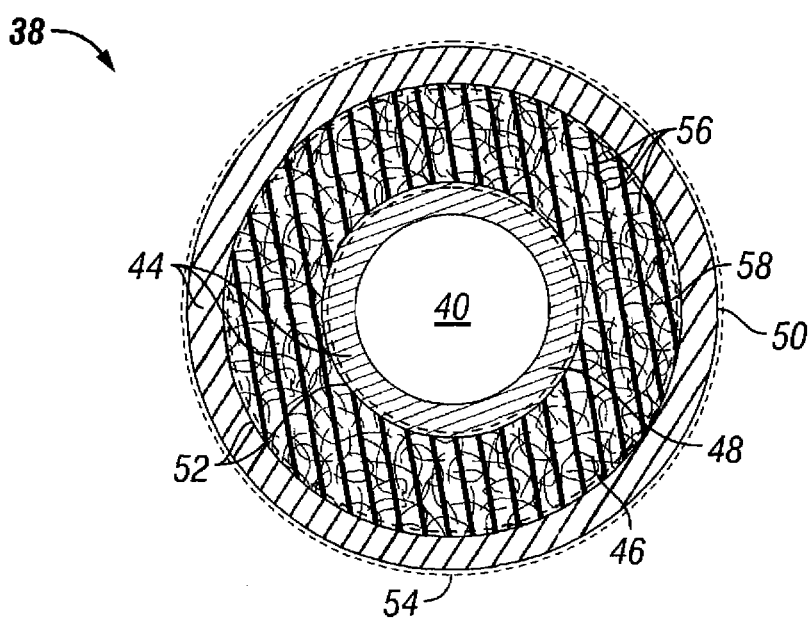
FIG. 3 is a cross-sectional view similar to that of FIG. 2 but showing an alternate embodiment of the micro-coil.

As further illustrated in FIG. 3, the composite micro-coil 38 also may incorporate additional or alternate layers. In the embodiment of FIG. 3, the composite micro-coil 38 incorporates one or more layers 52, such as bonding layers. An example of a material for forming a bonding layer is a suitable epoxy. The bonding layer 52 may be positioned between the non-metallic layer 46 and one or both of the metal layers 48 and 50. In the embodiment illustrated, the bonding layers 52 have negligible thickness but can add greater dependability and strength when employed in certain applications. Each layer 52 also may be formed from a thermoset, thermoplastic or thermoplastic elastomer material, e.g. nylon, disposed between the non-metallic layer 46 and one or both of the metal layers 48 and 50. Similarly, a jacket layer 54 may be placed around the outer metal layer 50 to both facilitate manufacturing and to reduce friction along an exterior of the composite micro-coil 38.

Referring again to FIGS. 2 and 3, the layers 44 may be formed from a variety of materials. In one embodiment, the inside metal layer 48 is made of stainless steel; the outside metal layer 50 is made of a nickel-iron-chromium alloy, such as Inconel; and the middle composite layer is made of a carbon-epoxy material. A fiber volume of the composite layer may vary, e.g. from about 30% to about 70% or from about 20% to about 75%, and is illustrated by fibers 56 in FIG. 3. In this embodiment, the materials selected to form layers 48, 50 and 46 are listed in the following Table 2:

TABLE 2

|  | density (kg/m³) | tensile strength (kpsi) |
|---|---|---|
| stainless steel | 8000 | 70 |
| Inconel 825 | 8000 | 85 |
| Carbon-epoxy | 1800 | 420 |

The sandwich construction shown in FIGS. 2 and 3 allows a variety of dimensional and material choices based on strength requirements, cost constraints, and operating environments.

However, the configuration of layers 44 and the selection of materials for forming layers 44 may vary according to the parameters of a given well treatment application and/or environment. For example, the non-metallic layer 46 may be a composite layer formed from a variety of materials to provide a major contribution to the superior performance of the composite micro-coil 38. The composite material layer 46 may include a matrix 58 with embedded fibers 56, as illustrated in FIG. 3. In alternative embodiments, the matrix material 58 may include any appropriate material such as epoxy, Peek, Pek, or any thermoset or any thermoplastic materials, among others; and the fiber may include any appropriate fiber such as carbon, Kevlar, glass, aluminum, ceramic, and steel, among others. The metal both on the metal internal layer 48 and the metal external layer 50 of the composite micro-coil 38 may be any appropriate metal, such as carbon steel, stainless steel, or Inconel, among others. The metal on the inside and outside of the micro-coil can be made of the same material or of different materials, as discussed above with respect to various embodiments.

There are typically two primary external loads acting on the micro-coil 38 during fluid pumping, namely, the fluid drag force due to fracturing fluid flow and the gravity/buoyancy effects. The micro-coil 38 has to survive the combination of these two external loads by virtue of its strength. This leads to the load-resistance governing equation, which provides the safe operation envelopes for the micro-coils in turbulent fracturing flow. A safe operation envelope provides the boundary of maximum flow rate and depth for a specific micro-coil. Thus it can be used as a convenient tool to evaluate the performance of various micro-coil designs.

Figure 4:
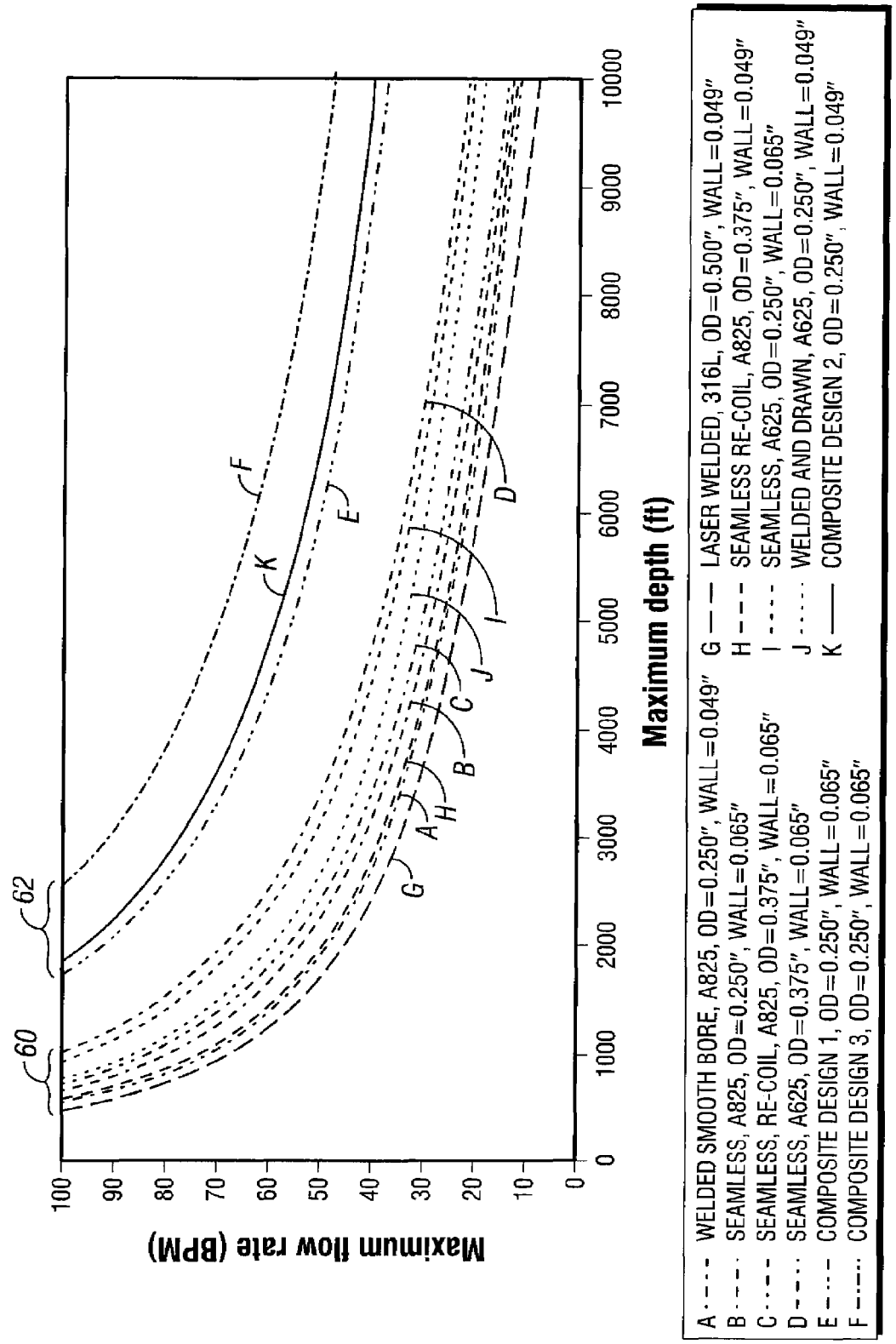
FIG. 4 is a graph comparing performance of embodiments of composite micro-coil relative to conventional types of tubing.

A plot of the safe operation envelopes for a variety of micro-coils is shown below in FIG. 4. For comparison purposes, conventional tubing structures, e.g. control lines, distributed temperature sensing (DTS) tubes, and chemical injection tubes are illustrated as conventional tubing structure group 60. The group of conventional tubing structures 60 is contrasted with the performance of three different embodiments of the composite micro-coil 38 with respect to maximum flow rate and maximum depth. The three embodiments of the present, composite micro-coil 38 are labeled group 62. As illustrated, the newly designed composite micro-coils 38 have substantially superior performance compared to existing tubing structures, such as existing metal tubes. The composite micro-coils 38 can reach higher flow rates at greater depths. Composite design 3, for example, can sustain a maximum flow rate of about 50 BPM at a target depth of about 10,000 ft.

The structure of composite micro-coil 38 also enables use of the micro-coil in performing other functions, such as the transmission of signals, e.g. data and/or power signals. For example, in embodiments where the composite layer 46 is formed from a good insulation material, the inner metal layer 48 can be used as a conductor. Similarly, when the composite layer 46 is a good insulator, one or more of the layers 52 can be formed as a bonded jacket. By way of example, the bonded jacket layer 52 can be extruded over the outside of the metal internal layer 48 or on the outside of the composite layer 46 to create a conductive path. These embodiments allow use of the composite micro-coil 38 for powering of an electric tool downhole without requiring a dedicated power cable.

Well system 20, well treatment system 22, and composite micro-coil 38 may be utilized in a variety of well applications and environments. The well treatment system 22 may be designed for fracturing applications or for a variety of other well treatment applications. Similarly, composite micro-coil 38 may be designed to deliver a variety of chemicals downhole to facilitate fracturing or a variety of other well service/well stimulation applications. In some applications, the composite micro-oil 38 may even be used to pump slurries, fibers, and other well stimulation materials downhole. The composite micro-coil 38 also may be routed downhole within or along many types of well equipment.

Depending on the specific chemicals, treatment applications, and environments, the composite micro-coil may be constructed with several types of materials. In many applications, a non-metallic layer is sandwiched between metallic layers, but the composition of the non-metallic layer may vary according to the environment and strength requirements. Many types of composite materials incorporate fibers or other additives to strengthen the overall layer. As discussed above, the composite layer may be formed from a carbon-epoxy composite material with high specific strength and low specific density. However, many other types of materials may be employed to construct both the composite layer and the layers on either side of the composite layer.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A method of delivering chemicals downhole, comprising:
    providing a composite micro-coil formed as a tubing having a tubing wall with a metal internal layer, a metal external layer, and a non-metal layer between the metal internal layer and the metal external layer;
    providing coiled tubing and disposing the coiled tubing downhole into a wellbore;
    conveying the composite micro-coil downhole into the wellbore, the composite micro-coil disposed in a one of an interior of the coiled tubing and an exterior of the coiled tubing; and
    delivering a chemical downhole along an interior of the composite micro-coil.

2. The method as recited in claim 1, wherein the metal internal layer comprises stainless steel.

3. The method as recited in claim 1, wherein the metal external layer comprises a nickel-iron-chromium alloy.

4. The method as recited in claim 1, wherein the non-metal layer comprises a composite layer.

5. The method as recited in claim 1, wherein the non-metal layer comprises a carbon-epoxy layer.

6. The method as recited in claim 1, wherein the non-metal layer comprises a composite layer having a fiber content of about 20 to about 75 percent.

7. The method as recited in claim 1, wherein the metal internal layer forms a conductive path and the non-metal layer is formed of an insulation material.

8. The method as recited in claim 1, further comprising placing a bonding layer between the non-metal layer and at least one of the metal internal layer and the metal external layer.

9. The method as recited in claim 1, further comprising placing a thermoplastic or thermoset layer between the non-metal layer and at least one of the metal internal layer and the metal external layer.

10. The method as recited in claim 1, further comprising placing an thermoplastic or thermoset jacket along an exterior of the metal external layer.

11. The method as recited in claim 1, further comprising performing a well treatment or stimulation application with the coiled tubing, wherein the chemical delivered along the micro-coil facilitates the well treatment or stimulation application.

12. A method for delivering chemicals downhole, comprising:
    selecting a plurality of layers of different materials;
    forming the plurality of layers into a micro-coil tubing such that the arrangement of layers increases a tubing strength to enable an increased flow rate of treatment fluid during a well treatment compared to a single layer metal micro-tubing;
    deploying a coiled tubing and the micro-coil tubing into a wellbore, the micro-coil tubing deployed adjacent to the coiled tubing;
    performing a well treatment operation with the coiled tubing; and
    facilitating the well treatment operation by delivering chemicals through an internal passage of the micro-coil tubing.

13. The method as recited in claim 12, further comprising delivering a chemical treatment through the micro-coil tubing to a desired wellbore location.

14. The method as recited in claim 12, wherein forming comprises forming the micro-coil tubing with a metal internal layer, a metal external layer, and a non-metal layer between the metal internal layer and the metal external layer.

15. The method as recited in claim 14, wherein forming comprises forming the metal internal layer with a steel material.

16. The method as recited in claim 15, wherein forming comprises forming the metal external layer with an alloy.

17. The method as recited in claim 16, wherein forming comprises forming the non-metal layer as an thermoplastic or thermoset layer mixed with a fiber.

18. A system for use in a wellbore operation comprising:
    a micro-coil, comprising:
        inner and outer metal layers; and
        a middle layer disposed between the inner and outer metal layers, wherein the middle layer comprises a composite material, wherein the outside diameter of the micro-coil is about 0.25 inches and wherein the micro-coil further defines an internal flow passage configured to deliver a chemical treatment therethrough; and
    a coiled tubing comprising hydraulic fracturing equipment disposed on an end thereof for performing a hydraulic fracturing operation, the micro-coil disposed adjacent the coiled tubing during the hydraulic fracturing operation and during the delivery of the chemical treatment.

19. The system as recited in claim 18, wherein the composite material comprises a matrix material having a plurality of fibers embedded therein.

20. The system as recited in claim 19, wherein matrix material is chosen from the group consisting of epoxy, Peek, Pek, thermoplastic and a thermoset material.

21. The system as recited in claim 20, wherein the plurality of fibers are chosen from the group consisting of Carbon, Kevlar, glass, aluminum, ceramic, steel, and combinations thereof.

22. The system as recited in claim 21, wherein the inner metal layer comprises a material chosen from the group consisting of carbon steel, stainless steel, and inconel.

23. The system as recited in claim 22, wherein the outer metal layer comprises a material chosen from the group consisting of carbon steel, stainless steel, and inconel.

* * * * *